(12) United States Patent
Motherwell (10) Patent No.: US 9,188,143 B1
(45) Date of Patent: Nov. 17, 2015

(54) MOTORCYCLE PARAPHERNALIA LATCHING SYSTEM

(71) Applicant: Kelly Motherwell, Langley (CA)

(72) Inventor: Kelly Motherwell, Langley (CA)

( * ) Notice: Subject to any disclaimer, the term of this patent is extended or adjusted under 35 U.S.C. 154(b) by 37 days.

(21) Appl. No.: 13/836,640

(22) Filed: Mar. 15, 2013

(51) Int. Cl.
 *E05C 3/06* (2006.01)
 *F16B 17/00* (2006.01)
 *E05C 3/30* (2006.01)

(52) U.S. Cl.
 CPC . *F16B 17/00* (2013.01); *E05C 3/30* (2013.01); *Y10S 292/37* (2013.01)

(58) Field of Classification Search
 CPC ....... E05C 3/30; Y10S 292/37; Y10S 292/53; F16B 17/00; B62J 1/28; B62J 7/04; B62J 11/00; B62J 19/40
 USPC ......... 292/57, 63, 64, 95, 109, 110, 121, 122, 292/127, 194, 195, 203, 207, 219, 333, 292/DIG. 37, DIG. 53, DIG. 61
 See application file for complete search history.

(56) References Cited

U.S. PATENT DOCUMENTS

| | | | | |
|---|---|---|---|---|
| 1,199,849 A | * | 10/1916 | Willoughby | 105/434 |
| 1,556,524 A | * | 10/1925 | Kibble et al. | 292/127 |
| 2,221,095 A | * | 11/1940 | Jacobi | 70/84 |
| 2,313,712 A | * | 3/1943 | Jacobi | 70/451 |
| 2,700,885 A | * | 2/1955 | Dall | 70/144 |
| 4,208,837 A | * | 6/1980 | Black et al. | 49/56 |
| 5,664,715 A | | 9/1997 | Gogan et al. | |
| 6,058,747 A | * | 5/2000 | Doyle et al. | 70/137 |
| 6,729,515 B2 | * | 5/2004 | Nicosia et al. | 224/413 |
| 7,175,220 B2 | | 2/2007 | Kashiwagi et al. | |

* cited by examiner

*Primary Examiner* — Kristina Fulton
*Assistant Examiner* — Christine M Mills
(74) *Attorney, Agent, or Firm* — Dwayne E. Rogge; Schacht Law Office, Inc.

(57) ABSTRACT

Described herein is a novel concept regarding the specific latching mechanism to provide a secure and easily releasable device. The latching mechanism is used to attach an accessory such as a luggage rack to a motorcycle or equivalent. The apparatus adds increased functionality, as well as protection to the internal moving components, protection of the user from the moving components, and in at least one example, a locking mechanism for additional safety and security.

15 Claims, 10 Drawing Sheets

MOTORCYCLE PARAPHERNALIA LATCHING SYSTEM

BACKGROUND OF THE DISCLOSURE

Field of the Disclosure

This disclosure relates to the field of locking mechanisms for motorcycles used to interconnect a motorcycle accessory to a motorcycle frame, sub-frame, or body panel.

SUMMARY OF THE DISCLOSURE

Disclosed herein is a latching mechanism for a motorcycle accessory in one form comprising a housing substantially enclosing inner moving components. The inner moving components comprising in turn: a linearly sliding release pin extending through the housing, the release pin having an inner portion within the housing, and an outer portion exterior of the housing; a release pin biasing spring biasing the release pin toward a latched position; a latching arm having interconnected to the release pin so as to reposition as the release pin is actuated and released; the latching arm having a latching arm seer surface; a jaw arm having a transverse pivot axis relative to the housing, the jaw arm interoperating with the latching arm seer surface through a jaw arm seer surface. The jaw arm comprising a jaw arm grasping surface; a jaw arm biasing spring biasing the jaw arm toward a released position; wherein the latching mechanism is configured to release the jaw arm from a latched position, toward a released position as the latching arm rotates until the latching arm seer surface no longer is in contact with the jaw arm seer surface. The housing further comprising a mounting structure operatively configured to interconnect the latching mechanism to the motorcycle accessory. The housing further comprising a housing grasping surface adjacent the jaw arm grasping surface when the jaw arm is in the latched position. The latching mechanism may be arranged wherein the latching arm is rotatably coupled to the housing. The latching mechanism in another example is arranged wherein the latching arm is coupled to the housing and linearly repositions relative thereto.

The latching mechanism described above may comprise a keyed locking mechanism configured to selectively permit repositioning of the latching arm. In one form, the latching mechanism is arranged wherein the locking mechanism rotates about an axis of rotation which is substantially at a right angle to the linear direction of travel of the release pin. To increase the ease of use of the locking mechanism, the latching mechanism may be arranged wherein the locking mechanism rotates about an axis of rotation which is offset from a right angle to the linear direction of travel of the release pin. In one form, the latching mechanism further comprises a linear actuator which repositions along the axis of rotation of the locking mechanism when the locking mechanism has released, and wherein the linear actuator contacts a portion of the latching arm and prohibits movement thereof.

A system for connecting an accessory to a motorcycle or equivalent is disclosed. This system using a plurality of mirror image latching mechanisms for a motorcycle accessory, each latching mechanism comprising a housing substantially enclosing inner moving components. The inner moving components comprising: a linearly sliding release pin extending through the housing, the release pin having an inner portion within the housing, and an outer portion exterior of the housing; a release pin biasing spring biasing the release pin toward a latched position; a latching arm having interconnected to the release pin so as to reposition as the release pin is actuated and released. The latching arm includes a latching arm seer surface. A jaw arm having a transverse pivot axis relative to the housing, the jaw arm interoperating with the latching arm seer surface through a jaw arm seer surface; the jaw arm comprising a jaw arm grasping surface; a jaw arm biasing spring biasing the jaw arm toward a released position; wherein the latching mechanism is configured to release the jaw arm from a latched position, toward a released position as the latching arm rotates until the latching arm seer surface no longer is in contact with the jaw arm seer surface. The housing further comprising a mounting structure operatively configured to interconnect the latching mechanism to the motorcycle accessory. The housing further comprising a housing grasping surface adjacent the jaw arm grasping surface when the jaw arm is in the latched position.

As above, the latching mechanism may be arranged wherein the latching arm is rotatably coupled to the housing. In another example, the latching arm is coupled to the housing and linearly repositions relative thereto. The latching mechanism may further comprise a keyed locking mechanism configured to selectively permit repositioning of the latching arm. The latching mechanism may be arranged wherein the locking mechanism rotates about an axis of rotation which is substantially at a right angle to the linear direction of travel of the release pin. In one form, the latching mechanism is configured such that the locking mechanism rotates about an axis of rotation which is offset from a right angle to the linear direction of travel of the release pin.

As above, one example is arranged wherein the locking mechanism further comprises a linear actuator which repositions along the axis of rotation of the locking mechanism when the locking mechanism has released, and wherein the linear actuator contacts a portion of the latching arm and prohibits movement thereof.

DESCRIPTION OF THE PREFERRED EXAMPLES

This disclosure relates to a novel concept regarding the specific latching mechanism to provide a secure and easily releasable device. The latching mechanism is used to attach an accessory such as the luggage rack 84 of FIG. 7A or the sissy bar 80 to a motorcycle 78 or equivalent. While releasable latching mechanisms PA20 have been utilized for some time in this field, such as the mechanisms described in U.S. Pat. Nos. 6,729,515 and 5,664,715, incorporated herein by reference, the improvements provided herein are significant and novel in light of the prior art. The improvements add increased functionality, as well as protection to the internal moving components, protection of the user from the moving components, and in at least one example, a locking mechanism for additional safety and security.

While the prior art latching mechanisms 82 functioned, they have been found to be aesthetically unappealing, and generally suffered from exposure to the elements. These apparatuses in many examples also exposed operators and adjacent hardware such as straps, clothing, etc to damage especially as the accessory (for example 84/80) is being attached to the motorcycle 78. In addition, as the release mechanism is substantially exposed (shown protruding from the device 82 of FIG. 7B), it is prone to catching on the users clothing, or other hardware which may result in an undesired release of the accessory. By enclosing most of the moving components, this danger is reduced, and the aesthetic appeal is improved.

The examples disclosed herein are improvements upon the apparatus disclosed in U.S. Ser. No. 61/407,311, filed Oct. 27, 2010 and U.S. Ser. No. 61/476,685 filed Apr. 18, 2011.

Figure 1:
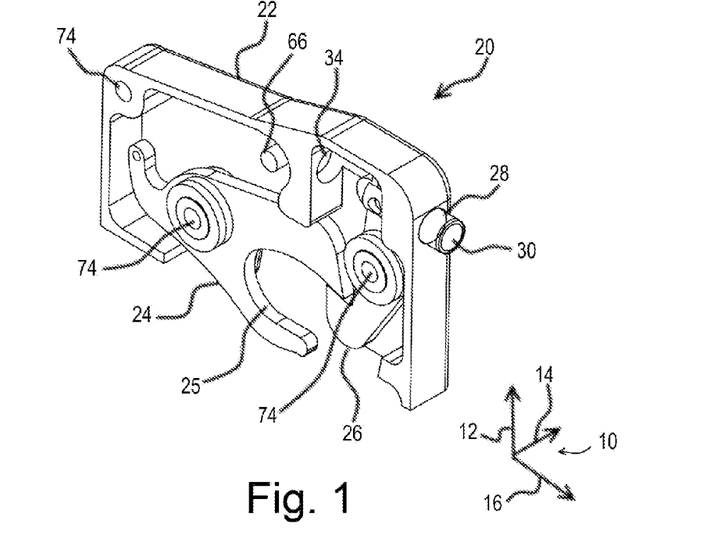
FIG. 1 is an isometric view of one example of the disclosure.

Looking to FIG. 1, an isometric view of a first example of the one example of the latching mechanism 20 can quite easily be seen, including a jaw arm 24 and interoperating latching arm 26. The jaw arm 24 having a jaw grasping surface 25. A pushbutton release pin 28 can also be easily seen in this view, including a pressure surface 30 which is pressed by a user to release the apparatus. Each of these parts will be described in more detail herein.

Before continuing with a detailed description, an axes system 10 is shown comprising a vertical axis 12, a transverse axis 14, and a longitudinal axis 16. These axes are used to define relative positions and directions of movement, and are not intended to limit the scope of the claims, except where specifically referenced in the claims.

It is expected that the operation and benefits of this latching mechanism 20 will be easily understood by one of ordinary skill in the art once the interoperating parts and functionality are described. Looking to FIG. 2, the release pin 28 can be seen in profile. The release pin 28 is operably configured to longitudinally slide within void 32 of the housing 22 in a direction of reciprocating travel indicated at 36. A biasing member such as for example the compression spring 38 recesses partly within the void 34 and biases the release pin 28 outward, away from the extension 40 toward a latched position where the seer surface of the latching arm retains the jaw arm in a latched position. In one form, the latching arm 26 comprises a channel 46 which fits around a portion of the release pin 28. A securing pin 28 may be used to further couple the release pin 28 to the latching arm 26 while still allowing linear motion of the release pin 28 to transfer linear motion of the release pin 28 to rotational movement of the latching arm 26. Thus, as the release pin 28 linearly repositions along direction of travel 36, a corresponding rotary motion will be experienced by the latching arm 26 about the pivot 42 in the direction shown at 44. The latching arm 26 also comprises a seer surface 50 terminating in a seer point 52.

The jaw arm 24 comprises a first end, terminating in the seer point 54, at the longitudinally outward end of the seer surface 56. The seer surface 56 engages the seer surface 50 of the latching arm when the latching mechanism 20 is in the latched position, and slides there against as the latching arm 26 rotates. As the seer point 52 of the latching arm 26 passes the seer point 54 of the jaw arm during rotation of the jaw arm 24 about a pivot 58 in direction of travel 60, the jaw arm 24 is released and is biased open either by external forces, or by a biasing member. In one form, the biasing member comprises a tension spring 62 which is attached at a first end 64 to a portion of the jaw arm, and attached at a second end 66 to the housing. The tension spring 62 or equivalent biasing member biases the jaw arm 24 to a released position as depicted by direction of travel arrow 60a in FIG. 5 toward a released position as depicted in FIG. 6. Thus, as the release pin 28 is engaged inward (toward housing 22), the latching arm 26 rotates and the seer surfaces 50 and 56 slide against each other until the seer point 52 on the latching arm 26 passes the seer point 54 on the jaw arm 24. At this point, the jaw arm 24 rotates to the released position (FIG. 6) by way of force exerted by the spring 62 or other biasing forces.

Figure 2:
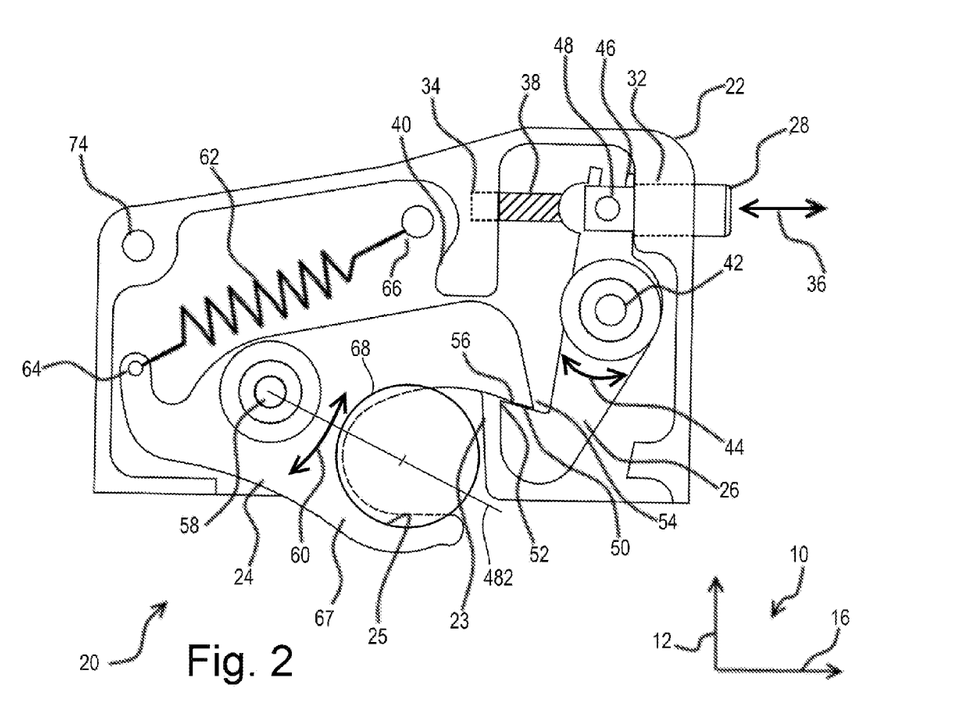
FIG. 2 is a side view of the example of FIG. 1.
Figure 3:
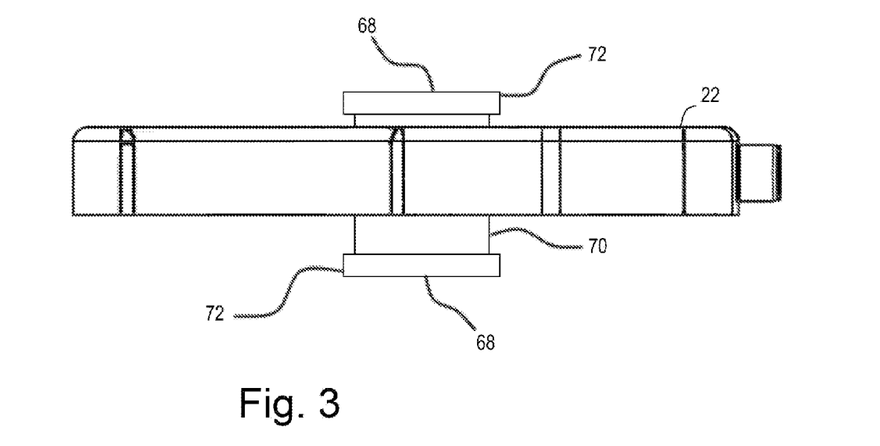
FIG. 3 is a top view of the example of FIG. 1.
Figure 3A:
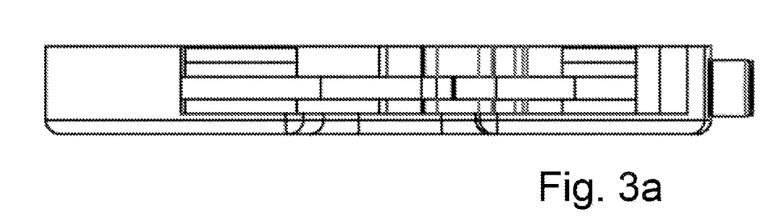
FIG. 3a is a bottom view of the example shown in FIG. 1.
Figure 4:
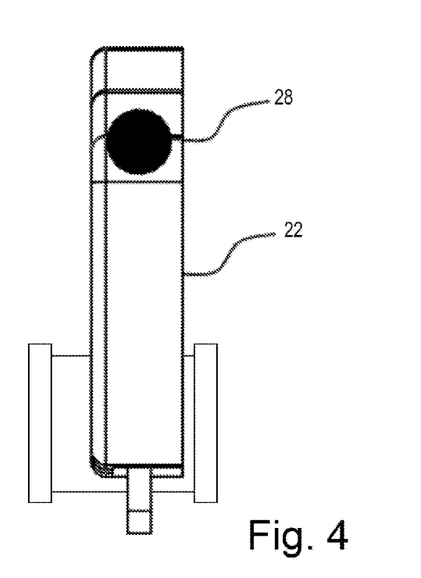
FIG. 4 is an end view of the example of FIG. 1.

As shown in the example of FIG. 2, the jaw arm 24 includes a second end 67 having a jaw grasping surface 25 configured to cooperate with a housing contact surface 23 of the housing 22 to engage and retain a grommet 68 or equivalent structure attached to the motorcycle. One example of such a grommet 68 is shown in the Figures of U.S. Pat. No. 5,664,715 including FIG. 6 where a particular arrangement and attachment method are disclosed. The grommet 68, as shown in this disclosure in one Example of FIG. 3, comprises a cylindrical center portion 70 and at least one flange 72. The enter portion 70 passes through a portion of the housing 22 and may extend transversely from both transverse sides of the housing 22.

In one example, the latching mechanism 20 is attached to the backrest, luggage rack, or other removable portion such as by screwing or bolting through voids 74 (FIG. 2), while the grommet 68 is mounted to the motorcycle or other structure. This arrangement can be reversed, as the latching mechanism 20 operates in different orientations provided the user has access to press the release pin 28, and space is allowed for rotation of the jaw arm 24.

Figure 5:
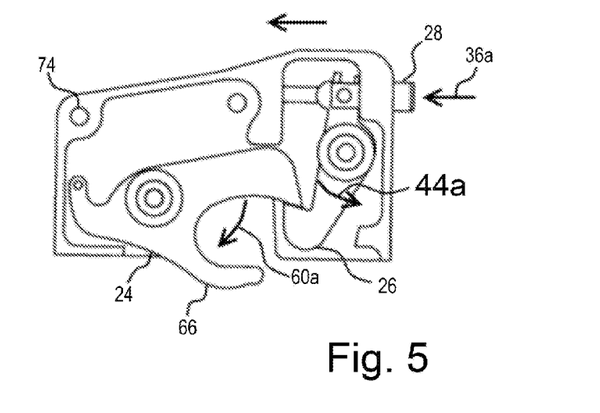
FIG. 5 is a side view of the example of FIG. 1 showing relative movement of the moving parts.
Figure 6:
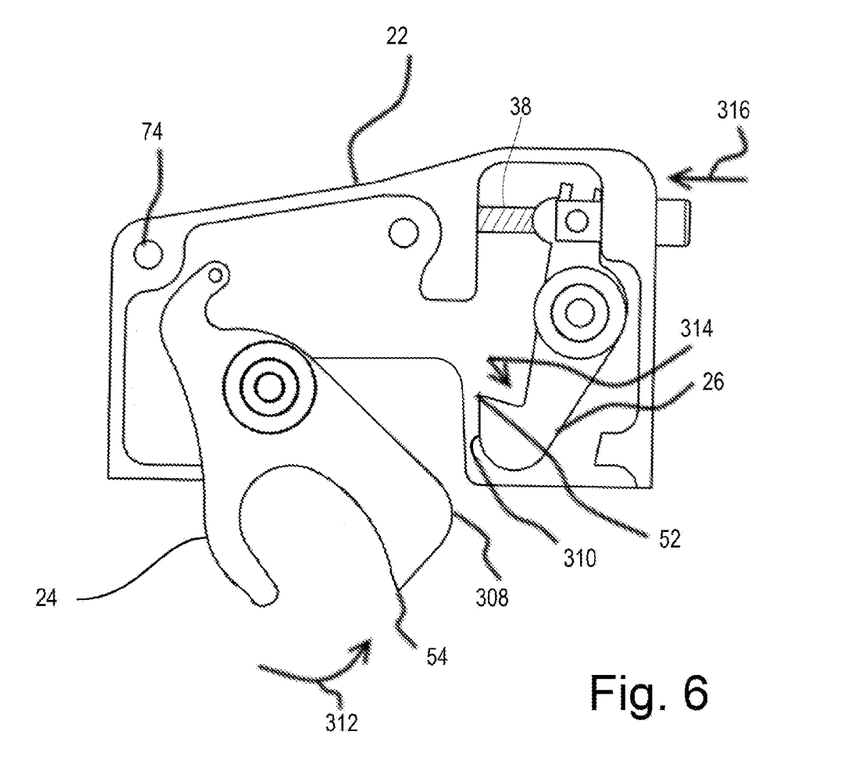
FIG. 6 is a side view of the example of FIG. 1 in an opened orientation.
Figure 7A:
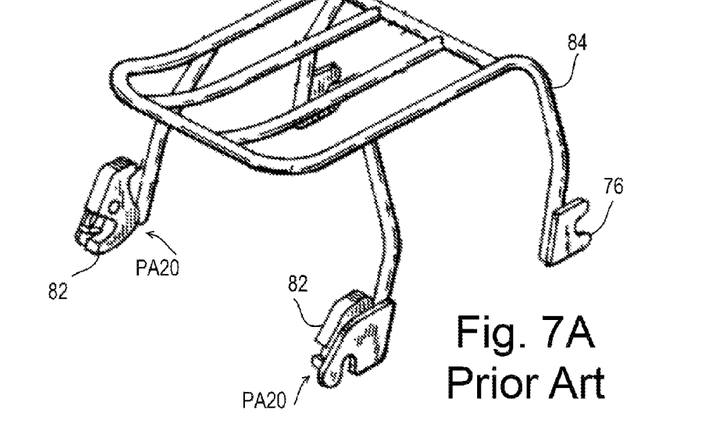
FIG. 7A is an isometric view of a prior art luggage rack and attachment system.
Figure 7B:
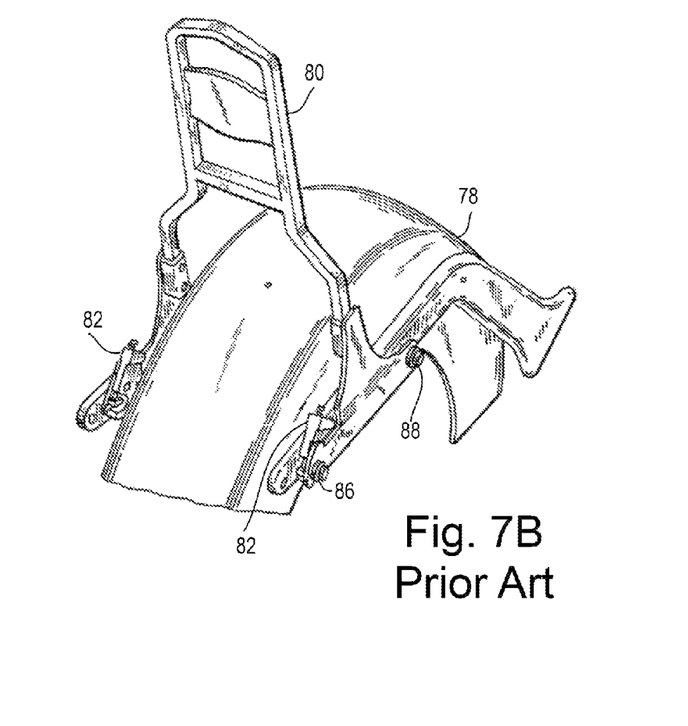
FIG. 7B is an isometric view of a prior art sissy bar and attachment system.

Looking to FIG. 5, it can be seen how when the release pin 28 is repositioned in direction of travel 36a, the latching arm 26 repositions in direction of travel 44a, and the jaw arm 24 repositions in direction of travel 60a. Thus, the jaw arm 24 will be repositioned from the latched position, shown in FIG. 5, to the released position, shown in FIG. 6, whereupon the backrest, luggage rack, etc. is released. Other latching positions may also be utilized, engaging release mechanisms or other apparatus to provide additional connection positions. In one example, the latching mechanisms 20 will be utilized in mirror image pairs, such as when mounted to the left and right sides of the accessory. The latching mechanisms may be operated in other arrangements, such as one latching mechanism per accessory, or sets of three, four, or more. For the most common accessories, it is expected that two latching mechanisms would be used, and additional latching points could be utilized, such as for example the forward mounting location 76 shown in FIG. 7 or a similar mechanism.

Figure 8:
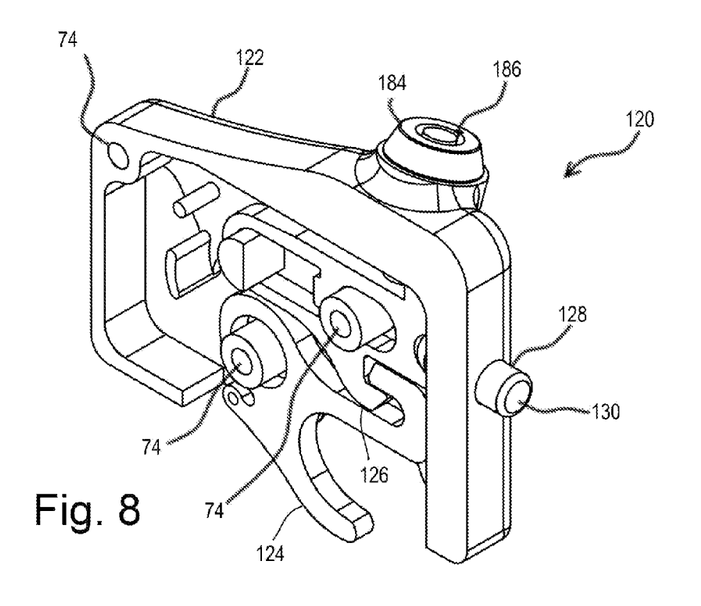
FIG. 8 is an isometric view of a second example of the disclosure.
Figure 9:
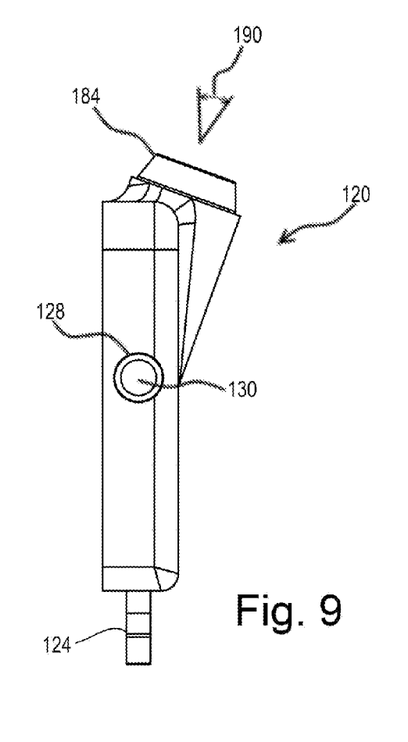
FIG. 9 is an end view of the example of FIG. 8.
Figure 10:
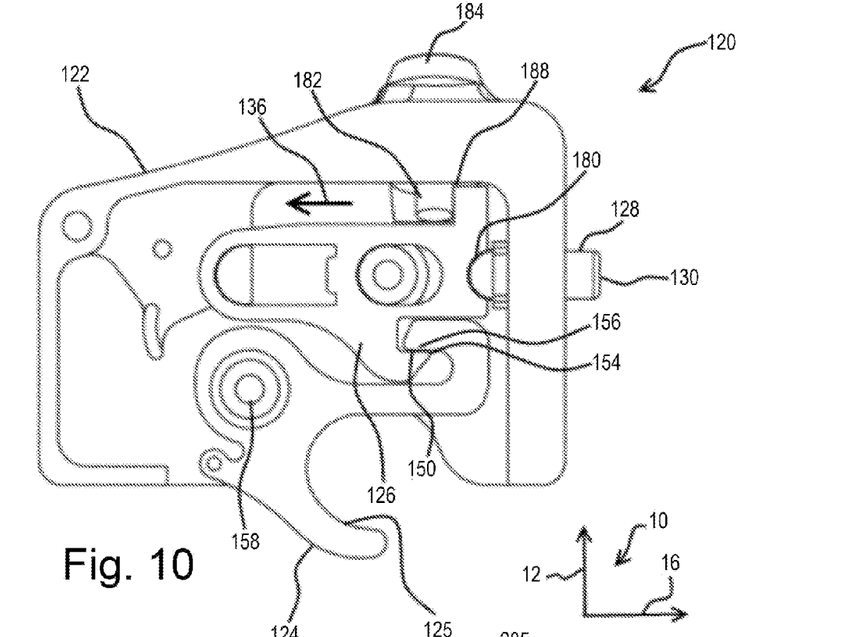
FIG. 10 is a side view of the example of FIG. 8.

Looking to FIGS. 8-10, a second example is shown, which operates on a very similar principle but without the latching arm 126 being rotatably attached to the housing 122. In this example, the latching arm 126 is linearly repositioned when the user engages the release pin 128.

To ease in description elements of this example, which perform the same or similar function to the previous example, are numbered with a 1 prefix. For example, the housing is numbered 22 in the first example shown in FIG. 1, whereas in FIG. 8, the housing is numbered 122. Generally speaking, the components of the second example not shown in the first example begin with the label 180.

Looking to FIG. 10, the housing 122 is shown where the release pin 128 comprises a pressure surface 130 as described above. Inside the housing, the release pin 128 may be attached to the latching arm 126 at a connection point 180. In this way, the latching arm 126 repositions longitudinally and linearly inward along direction of travel 136 when the release pin 128 is engaged (repositioned), provided that the lock cam 182 is positioned so as to allow such motion.

In one example, the lock cam 182 is an offset (non-cylindrical) surface that pivots about the axis of a locking mechanism 184. While a barrel-type key surface 186 is shown, other key types could be utilized. As the locking mechanism 184 rotates, a gap is provided at the contact location 188, allowing repositioning of the latching arm 126 along direction of travel 136.

As the latching arm 126 is repositioned, the seer surface 150 of the latching arm 126 slides along the matching seer surface 156 of the jaw arm 124 until the seer point 154 is passed, whereupon the jaw arm 124 rotates about pivot point 158 to release the mechanism as described above.

Figure 11:
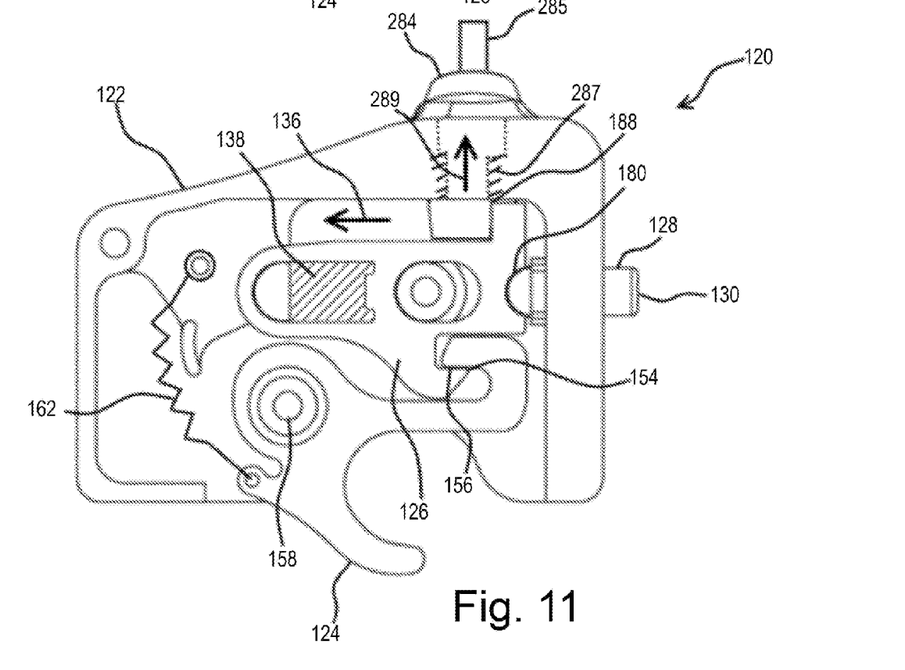
FIG. 11 is a side hidden line view of a third example of the disclosure.

For clarity, the compression spring 138 shown in FIG. 11 biases the latching arm 126 toward the latched position. The tension spring 162 is functionally equivalent to the tension spring 62 shown in the previous example.

As can be seen in FIG. 9, the locking mechanism 184 may be offset at an offset angle 190 to facilitate use of key as the frame or similar structure of the motorcycle may otherwise interfere with operation of a linearly aligned locking mechanism. In some applications, there may be very little clearance between the surface of the housing 122 of the latching mechanism 120, and the accessory to be attached thereto, as shown in FIG. 7A. The offset angle 190 allows for rotation of the key without the key or attached key ring etc. impacting the adjacent surface of the frame, fender, body panel, or other structure.

In another example shown in FIG. 11, the locking mechanism 284 is configured with a linear locking actuator 285 and a compression spring 287 rather than the cam 182 as shown in FIG. 10. In one example, when the locking mechanism 284 is rotated using the key, and the key is removed, the locking mechanism 284 releases the linear actuator 285 which repositions linearly outward 289 so that linear actuator 285 no longer interferes with movement of the latching arm 126.

Figure 12:
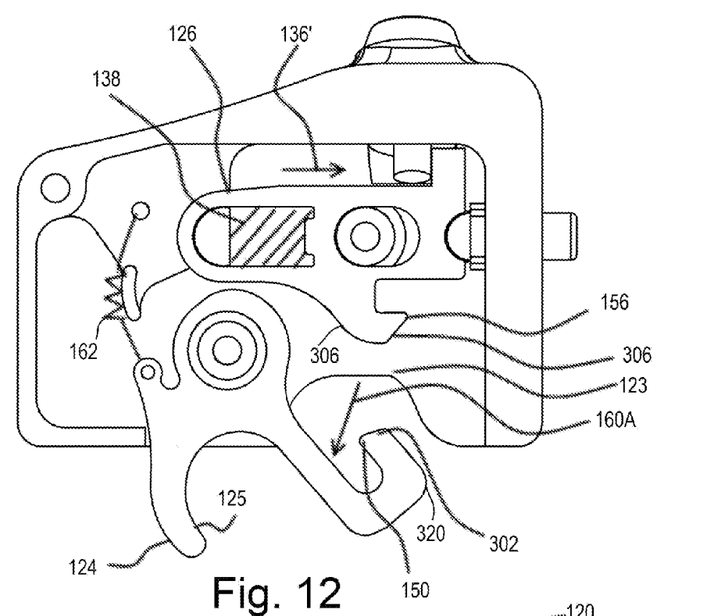
FIG. 12 is a side view of the example of FIG. 8 in an opened orientation.
Figure 13:
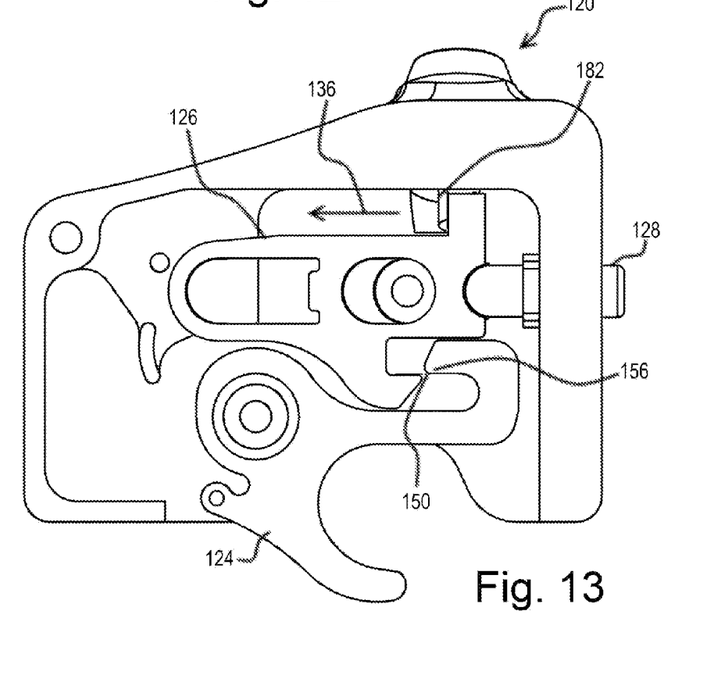
FIG. 13 is a side view of the example of FIG. 1 at the last moment of closure.

FIG. 13 shows one example of the latching mechanism 120 where the latching arm seer point 156 has moved linearly until it is just barely in contact with the jaw arm seer point 150. In this figure, the jaw arm 124 is maintained in the latched position. Looking to FIG. 12, the latching arm 126 has released the jaw arm 124, and the biasing member 138 has returned the latching arm 126 and release pin 128 in direction of travel 136'. The biasing member 162 has rotated the jaw arm 124 in direction of travel 160A to release the accessory from the grommet 68 or equivalent structure such that the accessory can be removed from the motorcycle or equivalent.

To install one example of the accessory onto the motorcycle (cycle) or equivalent, the latching mechanism 120 is released to the positions shown in FIGS. 6 and 12. If the accessory arrangement of FIG. 7A is used, the front mount locations 76 are attached to grommets or other portions of the cycle frame. The opposite longitudinal end of the accessory may then be rotated about these grommets 68 until another set of grommets 68 engage the jaw grasping surface 125 (FIG. 12) of the jaw arm 124. Additional force may be applied to overcome the tension of the biasing member or tension spring 62 until a contact surface 320 of the jaw arm contacts a mating contact surface 306 of the tension arm. Further force is applied to overcome the tension of the biasing member as the surfaces 320/306 slide against each forcing the latching arm 126 in a direction opposite the direction of travel 136' until the seer points 150/154 pass each other, at which time the compression spring 138 repositions the latching arm into the latched position (FIG. 11) and the jaw arm 124 is prohibited from rotating and releasing the accessory. The locking mechanism 184 may then be employed, keeping the latching arm from repositioning until released. The grommet is then held by the jaw grasping surface 125 in conjunction with the housing contact surface 123.

The example shown in FIG. 6 operates in a substantially equivalent manner. When the jaw arm 24 rotates in direction of travel 312, the contact surface 308 engages the contact surface 310 of the latching arm 26 forcing the latching arm 26 in direction of travel 314. Further rotation forces the latching arm in direction of travel 314 and forces the release pin in direction of travel 316, until the seer points 52/54 pass each other, and the tension spring 38 repositions the latching arm 26 in a direction opposite direction of travel 314, and repositions the release pin in a direction opposite direction of travel 316.

These manipulations in one example latch the accessory onto the cycle or equivalent without manual repositioning of the latching mechanisms.

Figure 14:
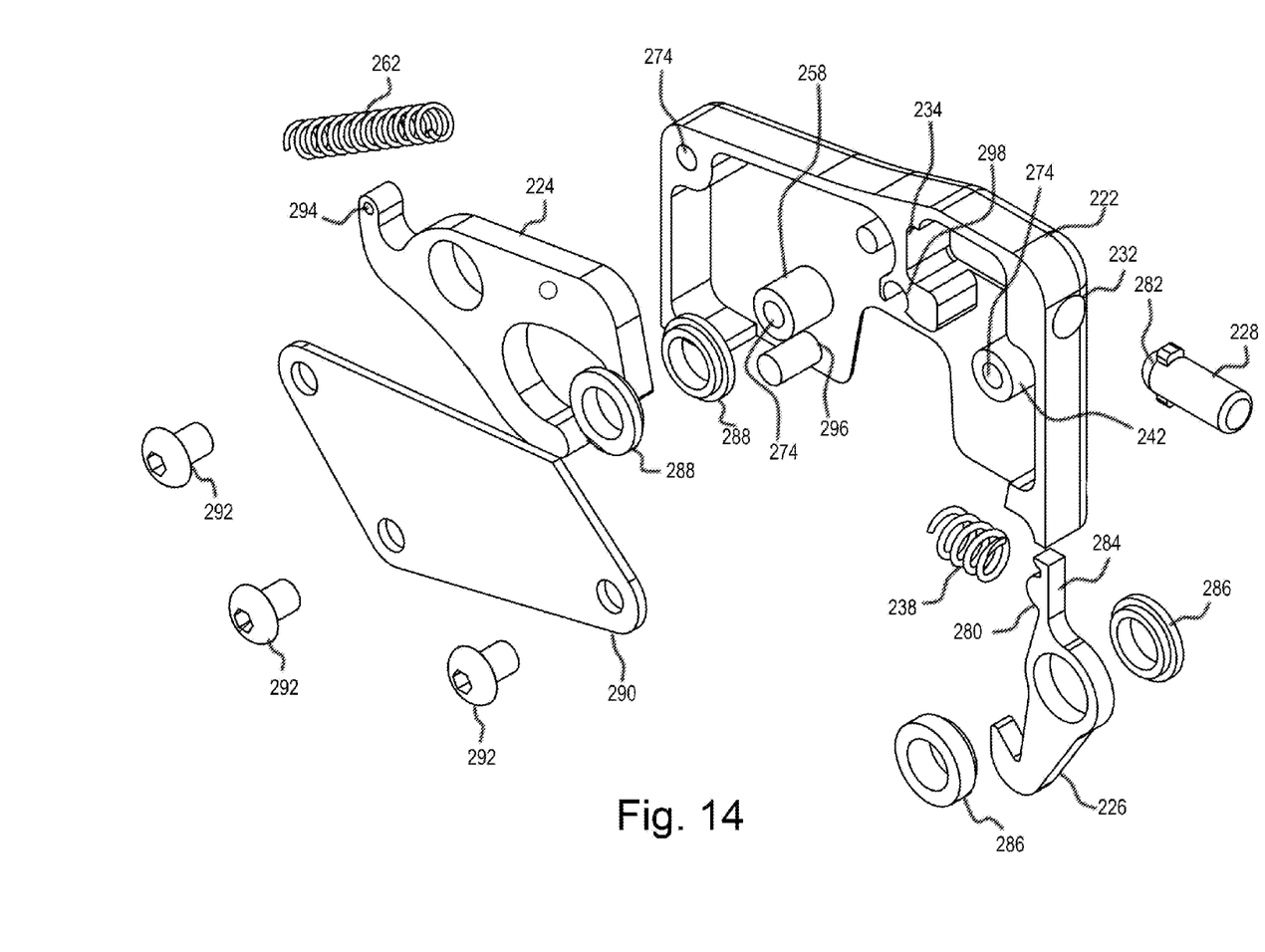
FIG. 14 is an exploded view of an example similar to the first example.

Looking to FIG. 14, a third example is shown, which operates on a very similar principle to the first example but wherein there are a few differences including that the compression spring 238 rests within a recess 234 of the housing 222 and engages a detent 280 on the latching arm 226. Elements of this example, which perform the same or similar function to the first example, are numbered with a 2 prefix. For example, the housing is numbered 22 in the first example shown in FIG. 1, whereas in FIG. 14, the housing is numbered 222. Generally speaking, the additional components of the second example not present in the first example begin with the number 280.

In addition to the modification to the previous examples noted above, the pin 48 and channel 46 of the previous examples are replaced by a structure where the innermost surface 282 of the release pin 228 engages a contact surface 284 of the latching arm 226.

Spacing washers 286 may be provided in this or the previous examples to correctly position the latching arm 226 relative to the pivot 242 that the latching arm 226 rotates about. These washers 286 may function to correctly position the latching arm, as well as to reduce friction, and may be comprised of a vibration dampening material to reduce noise and damage due to vibration of the latching arm 226 relative to the housing 222, especially when used on a moving and/or motorized vehicle.

Washers 288 may be provided in this or the previous examples to correctly position the jaw arm 224 relative to the pivot 258 that the jaw arm rotates about. These washers 288 may function to correctly position the jaw arm, as well as to reduce friction, and may be comprised of a vibration dampening material to reduce noise and damage due to vibration of the jaw arm 224 relative to the housing 222.

In addition, a (temporary) cover plate 290 may be provided in this and the previous examples. The cover plate 290 may be held in place by fasteners 292 or other methods to secure the jaw moving components in place within the housing 222. In one form the fasteners 292 engage (thread into) voids 274 and hold the cover plate in position during transportation sales etc. The cover plate 290 and fasteners 292 may be removed and discarded upon assembly of the apparatus to the motorcycle or accessory. Such removal is facilitated in that the surface of the motorcycle or accessory will hold the moving components in position within the housing 222.

On method of assembling this example is to insert the release pin 228 into the void 232 of the housing 222. The washers 286 may then be placed on either side of the latching arm 226, the compression spring 238 attached to the detent 280 of the latching arm 226 and this sub-assembly positioned onto the pivot 242. The tension spring 262 may then be attached to the hole 294 on the jaw arm 224 and the washers 288 also attached to the jaw arm 224. The jaw arm assembly may then be positioned upon the pivot 258. A malleable insert 296 may then be positioned within, or adhered within a pocket 298. The apparatus may then be tested for proper operation prior to attaching the cover plate 290 and/or installed.

Looking to FIG. 15-23 another example is shown with additional novel components. In this example a numeric prefix 4 will be utilized to denote similar components to those listed in the first example. For example the housing of the first example was labeled 22 while the housing of this example is labeled 422. Generally speaking, components of this example not previously shown begin with the label 480.

Figures 15, 16:
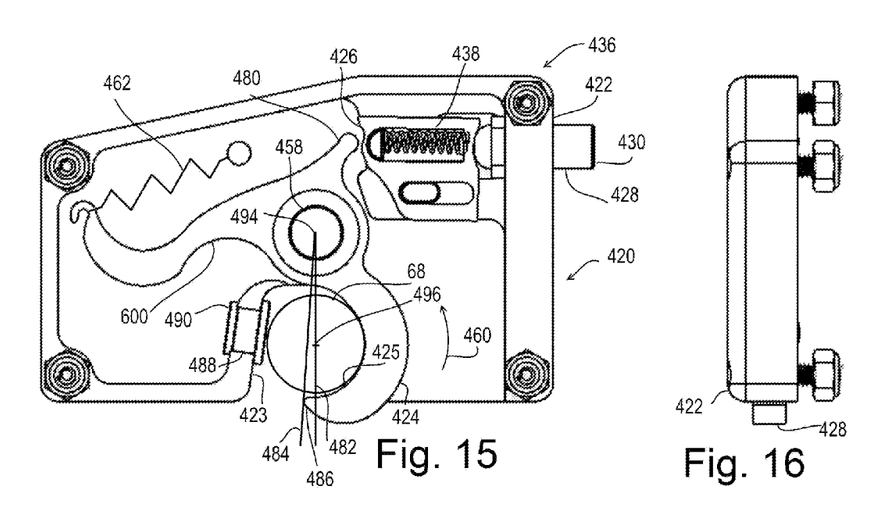
FIG. 15 is a side view of another example.
FIG. 16 is a rear view of the example shown in FIG. 15.
Figure 17:
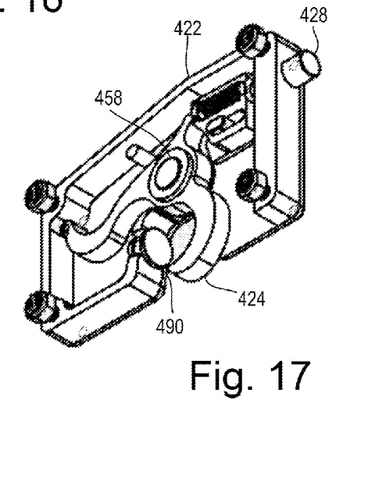
FIG. 17 is an isometric view of the example shown in FIG. 15.
Figure 18:
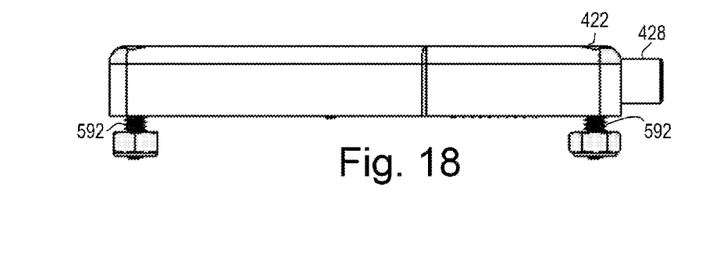
FIG. 18 is a top view of the example shown in FIG. 15.
Figure 19:
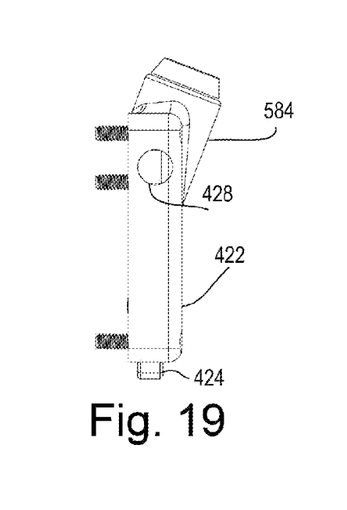
FIG. 19 is a front view of a lockable variation of the example shown in FIG. 15.
Figure 20:
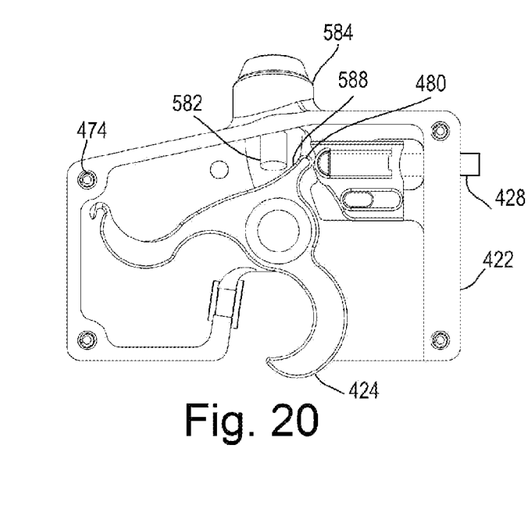
FIG. 20 is a side view of the example shown in FIG. 19.
Figure 21:
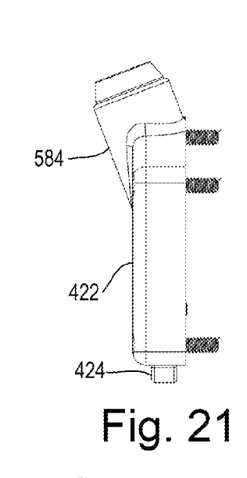
FIG. 21 is a rear view of the example shown in FIG. 19.
Figure 22:
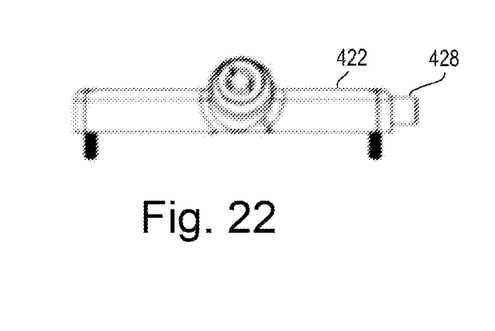
FIG. 22 is a top view of the example shown in FIG. 19.
Figure 23:
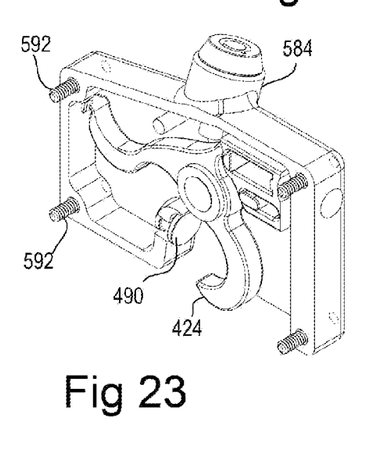
FIG. 23 is an isometric view of the example shown in FIG. 19.

Looking to FIG. 15, it can be appreciated that as with the example shown in FIG. 10, a pin 428 projects from the housing 422 and generally has a pressure surface 430 on the exterior thereof. Force exerted against the pressure surface 430 will reposition the latching arm 426 inward (direction 436) against the compression spring 438. When sufficient force is applied to overcome the compression spring 438 movement of the latching arm 426 will result in pressure exerted upon a protrusion or hammer 480 extending radially outward from the jaw arm 424. When sufficient force is applied thereto to overcome pressure exerted by the tension spring 462, the jaw arm 424 will reposition in direction of travel 460. Of particular note, the direction of rotation to open the jaw arm 424 in relation to the housing 422 is reversed from that as shown in the previous examples such as FIG. 2. In addition, looking to FIG. 2, it can be appreciated that a line 482 drawn from the center 494 of the pivot 58 through the center 496 of the grommet 68 will not pass through the grasping surface 25 of the jaw arm 24. This arrangement is such that any upward force on the housing 22 which would tend to remove the housing 22 from the grommet 68 will be transferred to the seer surfaces 56/50 and contact between these seer surfaces will prohibit rotation of the jaw arm 24 and release of the grommet. Looking to FIG. 15 a different arrangement is provided wherein the line 482 drawn between the center of the pivot 458 and the center of the grommet 68 will pass through the grasping surface 425. Likewise, a line 484 drawn between the center of the pivot 458 and the distal end 486 of the jaw arm 424 will be distally offset from the line 482. In engineering terms, the jaw arm 424 extends past dead center of the grommet 68 in relation to the pivot 458. Thus, any upward force on the housing 422 relative to the grommet 68 will be transferred to the pivot 458 and the jaw arm 424 will experience no rotational forces. Light tension of the tension spring 462 will be sufficient to overcome vibration and other internal forces which may bias the jaw arm 424 to an open position.

While the previous examples utilized release of interoperating seer surfaces to release the latching arm from the jaw arm, in this example such seer surface release is not required due to the top center positioning previously described. However, without some sort of release mechanism, one would need to actively and directly engage the jaw arm 424 before a grommet 68 could be released therefrom. Thus, it can be understood that pressure in direction of travel 436 upon the pressure surface 430 will reposition the pin 428 and latching arm 426 toward the hammer 480. Pressure upon the hammer 480 in this direction will begin to rotate the jaw arm 424 in direction of travel 460. Following such rotation, once the distal end 486 of the jaw arm 424 has rotated past the top dead center position (shown by line 482), upward force upon the housing 422 in relation to the grommet 68 will release the housing 422 from the grommet 68.

Still looking to FIG. 15 it can be appreciated that a surface 488 may be provided on the housing contact surface 423 through which a malleable bumper 490 may be placed to further reduce vibration affects transferred from the grommet 68 to the housing 422.

While the fasteners 492 shown in FIG. 14 are generally standard threaded (machine) screws, the fasteners 592 shown in FIGS. 15-25 are generally threaded rods fastened into the voids 474 of the housing 422 and threaded nuts may be engaged thereupon to fasten the assembly 422 a cycle or equivalent structure.

Also shown is one example of a relief region 600 of the jaw arm 424 which allows the grommet to be removed from the apparatus without interference from the jaw arm 424 when the haw arm 424 is in a released position.

Looking to FIGS. 19-23, it can be appreciated that a locking mechanism 584 similar to that shown as element 184 of FIG. 10 may be utilized. In particular, the locking mechanism 584 has a lock arm 582 projecting inward into the housing 422. In one form, the lock arm 582 engages a contact location 588 on the protrusion/hammer 480.

It can be less appreciated that when the locking mechanism 584 is in the locked position, rotation of the jaw arm 424 is directly prohibited by the lock arm 582. While the present invention is illustrated by description of several examples and while the illustrative examples are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A latching mechanism for a motorcycle accessory to be removably attached to a motorcycle; the latching mechanism comprising:
   a housing substantially enclosing inner moving components on at least four sides;

wherein a fifth side of the housing is capable of contact with the motorcycle accessory;
the inner moving components comprising:
a linearly sliding release pin extending through a surface defining a void in one side of the housing, the release pin having an inner portion within the housing, and an outer portion exterior of the housing;
a linearly repositioning latching arm in contact with the release pin so as to reposition in a first direction as the release pin is actuated;
a jaw arm having a transverse pivot axis relative to the housing;
the jaw arm comprising a jaw arm grasping surface with a distal end;
a jaw arm biasing tension spring, wherein the jaw arm biasing spring biases the jaw arm toward a latched position;
wherein the latching mechanism is configured to reposition the jaw arm from a latched position toward a released position as the release pin is actuated;
the housing further comprising a mounting structure operatively configured to interconnect the fifth side of the housing to the motorcycle accessory;
wherein the latching mechanism comprises a substantially cylindrical grommet for affixing to the motorcycle;
the housing further comprising a housing grasping surface adjacent the jaw arm grasping surface;
the housing grasping surface in direct contact with the grommet when the jaw arm is in the latched position; and
wherein the jaw arm is free to move independently of the release pin in a first rotational direction.

2. The latching mechanism as recited in claim 1 further comprising a keyed locking mechanism configured to selectively permit repositioning of the jaw arm.

3. The latching mechanism as recited in claim 2 wherein the locking mechanism rotates about an axis of rotation which is substantially at a right angle to the linear direction of travel of the release pin.

4. The latching mechanism as recited in claim 2 wherein the locking mechanism rotates about an axis of rotation which is offset from a right angle to the linear direction of travel of the release pin.

5. The latching mechanism as recited in claim 2 wherein the locking mechanism further comprises a linear actuator which repositions along the axis of rotation of the locking mechanism when the locking mechanism has released, and wherein the linear actuator contacts a portion of the latching arm and prohibits movement thereof.

6. The latching mechanism as recited in claim 1 wherein:
the jaw arm is in intermittent contact with the latching arm so as to reposition the distal end of the jaw arm in the first rotational direction past a top dead center line as the release pin is actuated;
the substantially cylindrical grommet has an axial center; and
wherein the top dead center line is defined as a line drawn from the radial center of the transverse pivot axis and through the axial center of the grommet.

7. The latching mechanism as recited in claim 1 wherein the jaw arm comprises:
a first extension contacting the grommet;
a second extension contacting the latching arm; and
a third extension coupled to the jaw arm biasing tension spring.

8. A plurality of mirror image latching mechanisms for a motorcycle accessory to be removably attached to a motorcycle, each latching mechanism comprising:
a housing substantially enclosing inner moving components on at least four sides;
wherein a fifth side of the housing is capable of contact with the motorcycle accessory;
the inner moving components comprising:
a linearly sliding release pin extending through a surface defining a void in one side of the housing, the release pin having an inner portion within the housing, and an outer portion exterior of the housing;
a linearly repositioning latching arm in contact with the release pin so as to reposition in a first direction as the release pin is actuated;
a jaw arm having a transverse pivot axis relative to the housing;
the jaw arm comprising a jaw arm grasping surface with a distal end;
a jaw arm biasing tension spring, wherein the jaw arm biasing spring biases the jaw arm toward a latched position;
wherein the latching mechanism is configured to reposition the jaw arm from a latched position toward a released position as the release pin is actuated;
the housing further comprising a mounting structure operatively configured to interconnect the fifth side of the housing to the motorcycle accessory;
wherein the latching mechanism comprises a substantially cylindrical grommet for affixing to the motorcycle;
the housing further comprising a housing grasping surface adjacent the jaw arm grasping surface;
the housing grasping surface in direct contact with the grommet when the jaw arm is in the latched position; and
wherein the jaw arm is free to move independently of the release pin in a first rotational direction.

9. The latching mechanism as recited in claim 8 wherein the latching arm is coupled to the housing and linearly repositions relative thereto.

10. The latching mechanism as recited in claim 9 further comprising a keyed locking mechanism configured to selectively permit repositioning of the jaw arm.

11. The latching mechanism as recited in claim 10 wherein the locking mechanism rotates about an axis of rotation which is substantially at a right angle to the linear direction of travel of the release pin.

12. The latching mechanism as recited in claim 10 wherein the locking mechanism rotates about an axis of rotation which is offset from a right angle to the linear direction of travel of the release pin.

13. The latching mechanism as recited in claim 10 wherein the locking mechanism further comprises a linear actuator which repositions along the axis of rotation of the locking mechanism when the locking mechanism has released, and wherein the linear actuator contacts a portion of the latching arm and prohibits movement thereof.

14. The latching mechanism as recited in claim 8 wherein:
the jaw arm is in intermittent contact with the latching arm so as to reposition the distal end of the jaw arm in the first rotational direction past a top dead center line as the release pin is actuated;
the substantially cylindrical grommet has an axial center; and
wherein the top dead center line is defined as a line drawn from the radial center of the transverse pivot axis and through the axial center of the grommet.

15. The latching mechanism as recited in claim 8 wherein the jaw arm comprises:
a first extension contacting the grommet;
a second extension contacting the latching arm; and
a third extension coupled to the jaw arm biasing tension spring.

* * * * *